United States Patent
Innami et al.

(10) Patent No.: US 11,975,717 B2
(45) Date of Patent: May 7, 2024

(54) VEHICLE CONTROL SYSTEM

(71) Applicant: SUBARU CORPORATION, Tokyo (JP)

(72) Inventors: Yuya Innami, Tokyo (JP); Masatoshi Minakawa, Tokyo (JP); Daiki Koike, Tokyo (JP); Toshihiro Hayashi, Tokyo (JP); Ryo Fukuhara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 44 days.

(21) Appl. No.: 17/853,110

(22) Filed: Jun. 29, 2022

(65) Prior Publication Data

US 2023/0017726 A1    Jan. 19, 2023

(30) Foreign Application Priority Data

Jul. 15, 2021    (JP) .................................. 2021-117376

(51) Int. Cl.
*G01C 21/00*    (2006.01)
*B60W 30/18*    (2012.01)

(52) U.S. Cl.
CPC ... *B60W 30/18109* (2013.01); *G01C 21/3889* (2020.08); *B60W 2552/53* (2020.02); *B60W 2554/4041* (2020.02)

(58) Field of Classification Search
CPC ....... B60W 30/18109; B60W 2552/53; B60W 2554/4041; G01C 21/3889
See application file for complete search history.

(56) References Cited

U.S. PATENT DOCUMENTS

| | | | |
|---|---|---|---|
| 11,285,935 B2 * | 3/2022 | Adachi | B60W 30/181 |
| 2020/0109953 A1 | 4/2020 | Hokai et al. | |
| 2020/0391764 A1 * | 12/2020 | Gotou | B60W 30/143 |
| 2021/0182576 A1 * | 6/2021 | Kuriyama | G06V 20/588 |
| 2021/0207973 A1 * | 7/2021 | Kitahama | G01C 21/3602 |
| 2021/0339746 A1 * | 11/2021 | Yatagai | B60W 30/10 |
| 2021/0365701 A1 * | 11/2021 | Eshet | G06V 20/64 |
| 2022/0080967 A1 * | 3/2022 | Watanabe | B60W 60/0015 |
| 2022/0153267 A1 * | 5/2022 | Ito | B60W 30/18109 |
| 2022/0250622 A1 * | 8/2022 | Yu | B60W 30/18163 |
| 2023/0017726 A1 * | 1/2023 | Innami | G01C 21/3889 |

FOREIGN PATENT DOCUMENTS

JP    2020-060369 A    4/2020

* cited by examiner

*Primary Examiner* — Peter D Nolan
*Assistant Examiner* — Ashley L Redhead, Jr.
(74) *Attorney, Agent, or Firm* — Rimon P.C.

(57) ABSTRACT

A vehicle control system includes a detector and a processor. The detector is configured to detect a first stop line on the basis of map data stored in a road map database, and detect a second stop line on the basis of traveling environment data acquired by a camera unit. In a case where the detector detects the first stop line, the processor is configured to control a vehicle to decelerate at a first deceleration rate calculated on the basis of a distance from the vehicle to the first stop line. In a case where the detector detects the second stop line after detecting the first stop line, the processor is configured to control the vehicle to decelerate at a second deceleration rate calculated on the basis of a distance from the vehicle to the second stop line and stop at the second stop line.

6 Claims, 6 Drawing Sheets

VEHICLE CONTROL SYSTEM

CROSS-REFERENCE TO RELATED APPLICATIONS

The present application claims priority from Japanese Patent Application No. 2021-117376 filed on Jul. 15, 2021, the entire contents of which are hereby incorporated by reference.

BACKGROUND

The technology relates to a vehicle control system.

Some vehicle control apparatuses recognize a state of a road surface ahead of a vehicle by means of a camera, detect a stop line on the road surface, and perform a vehicle traveling control necessary for stopping the vehicle in front of the detected stop line.

To increase an accuracy of a driving assist control, it is important to increase precision of map data. For example, Japanese Unexamined Patent Application Publication (JP-A) No. 2020-60369 discloses a map data system that increases precision of map data on road surface signs used for the driving assist control.

SUMMARY

An aspect of the technology provides a vehicle control system to be applied to a vehicle. The vehicle control system includes a detector and a processor. The detector is configured to detect a first stop line on the basis of map data stored in a road map database, and detect a second stop line on the basis of traveling environment data acquired by a camera unit. The traveling environment data is data on a traveling environment ahead of the vehicle. In a case where the detector detects the first stop line, the processor is configured to control the vehicle to decelerate at a first deceleration rate calculated on the basis of a distance from the vehicle to the first stop line. In a case where the detector detects the second stop line after detecting the first stop line, the processor is configured to control the vehicle to decelerate at a second deceleration rate calculated on the basis of a distance from the vehicle to the second stop line and stop at the second stop line.

An aspect of the technology provides a vehicle control system to be applied to a vehicle. The vehicle control system includes circuitry configured to detect a first stop line on the basis of map data stored in a road map database. The circuitry is configured to detect a second stop line on the basis of traveling environment data acquired by a camera unit. The traveling environment data is data on a traveling environment ahead of the vehicle. Upon detecting the first stop line, the circuitry is configured to control the vehicle to decelerate at a first deceleration rate calculated on the basis of a distance from the vehicle to the first stop line. Upon detecting the second stop line after detecting the first stop line, the circuitry is configured to control the vehicle to decelerate at a second deceleration rate calculated on the basis of a distance from the vehicle to the second stop line and stop at the second stop line.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
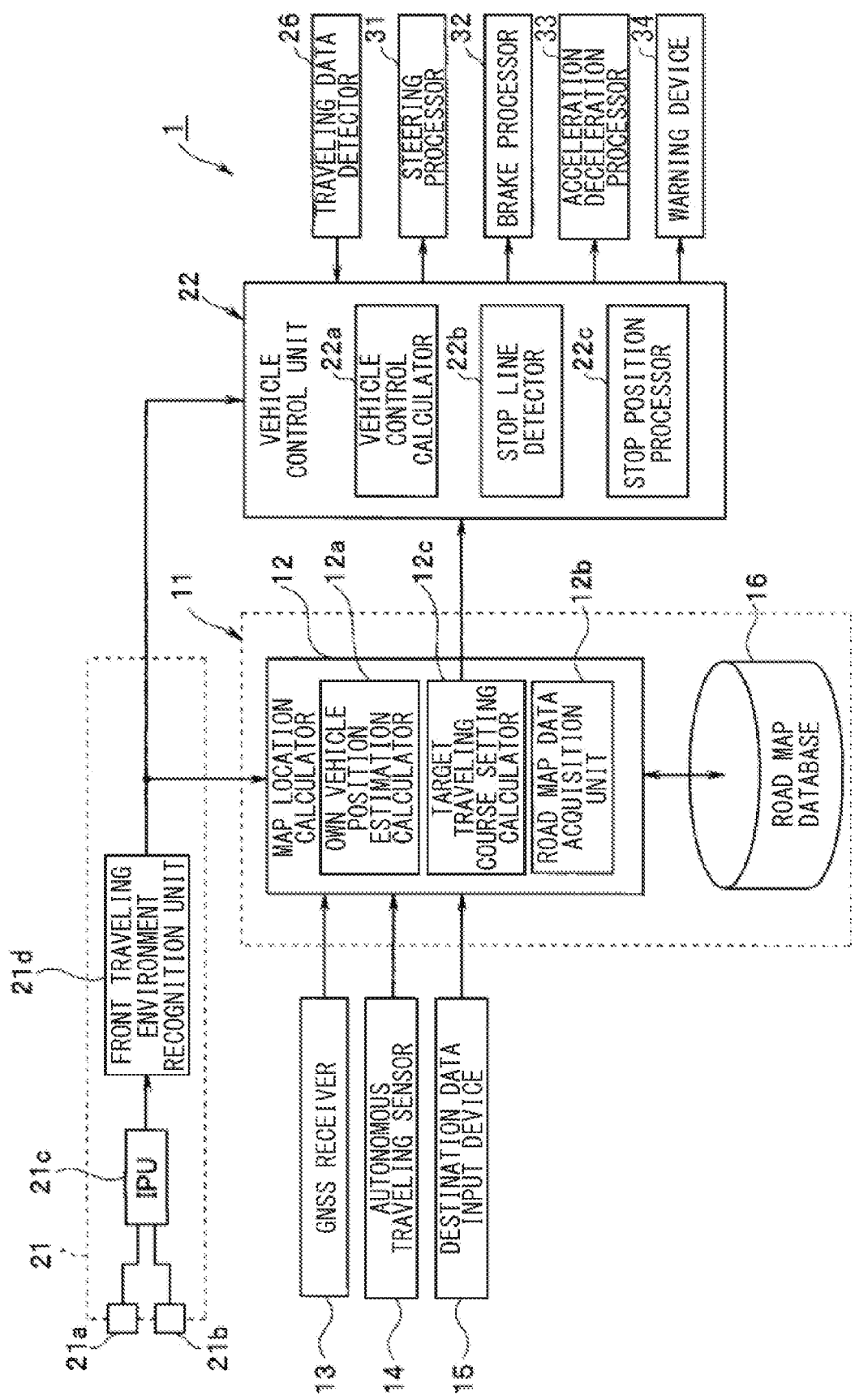
FIG. 1 is a block diagram illustrating a configuration of a vehicle control system according to one example embodiment of the technology.

It is difficult to secure a control time required for stopping a vehicle at a stop line, in a case where a detection of the stop line by a camera is delayed. In this case, it is difficult to perform an override of an automatic stop system aimed at the stop line, which can make an opportunity for a driving assistance less frequent. Alternatively, execution of a deceleration control can still be successful. However, the vehicle can decelerate suddenly due to a short control time, which can give a driver a sense of discomfort.

A technique disclosed in JP-A No. 2020-60369 increases precision of map data on road surface signs, but can involve a mismatch with respect to an actual stop line. Accordingly, it is difficult for the technique disclosed in JP-A No. 2020-60369 to accurately stop a vehicle at the stop line.

It is desirable to provide a vehicle control system that makes it possible to smoothly decelerate a vehicle to a stop line and accurately stop the vehicle at the stop line.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference numerals to avoid redundant description.

First, a schematic configuration of a vehicle control system according to an example embodiment of the technology will be described below with reference to a block diagram illustrated in FIG. 1.

Figure 2:
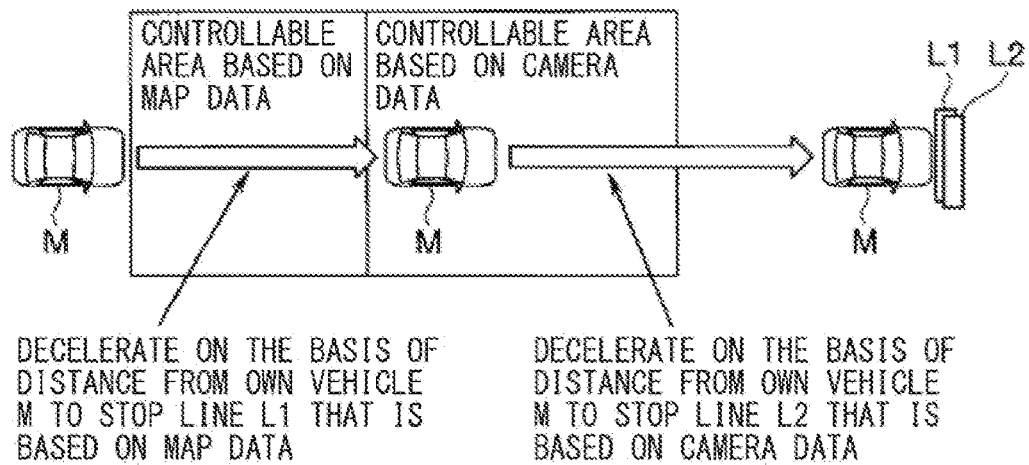
FIG. 2 is a diagram illustrating an example situation of an automatic stop of a vehicle through combined use of map data and camera data.

A vehicle control system 1 illustrated in FIG. 1 may be mounted on an own vehicle M (see FIG. 2). The vehicle control system 1 may include a locator unit 11, a camera unit 21, and a vehicle control unit 22. The locator unit 11 may detect a position of the own vehicle M (hereinafter also referred to as an "own vehicle position"). The camera unit 21 may acquire front traveling environment data. The vehicle control unit 22 may control the own vehicle M.

The locator unit 11 may estimate the own vehicle position on a road map and acquire road map data on a region around the own vehicle position. The camera unit 21 may acquire the traveling environment data on a traveling environment ahead of the own vehicle M and recognize two lane lines defining left and right of a lane along which the own vehicle M is traveling, a road shape, presence of a preceding vehicle, and presence of a traffic light, for example. The camera unit 21 may also determine a road curvature of a middle of the lane between the left and right lane lines, an intervehicle distance between the own vehicle M and the preceding vehicle, and a relative speed between the own vehicle M and the preceding vehicle, for example.

The locator unit 11 may include a map location calculator 12 and a high-precision road map database 16 that serves as a storage. The high-precision road map database 16 is abbreviated as "road map DB 16" in FIG. 1. In one embodiment, the high-precision road map database 16 may serve as a "road map database". The map location calculator 12, a front traveling environment recognition unit 21d to be described below, and the vehicle control unit 22 may each include a known microcomputer that includes a central processing unit (CPU), a random access memory (RAM), and a read only memory (ROM), for example, and a peripheral device. The ROM may preliminarily store a program to be executed by the CPU and a base map or other fixed data, for example.

The map location calculator 12 may have an input terminal coupled to a global navigation satellite system (GNSS) receiver 13, an autonomous traveling sensor 14, and a destination data input device 15. The GNSS receiver 13 may receive positioning signals from a plurality of positioning satellites. The autonomous traveling sensor 14 may help achieve autonomous traveling of the own vehicle M in an environment, such as a region in a tunnel, where the own vehicle M has difficulty in receiving effective positional signals from the GNSS satellites due to decreased sensitivity of the GNSS receiver 13. The autonomous traveling sensor 14 may include a vehicle speed sensor, a gyroscope sensor, and a longitudinal acceleration sensor, for example. The map location calculator 12 may determine a travel distance and an azimuth of the own vehicle M on the basis of a vehicle speed of the own vehicle M (hereinafter also referred to as "own vehicle speed") detected by the vehicle speed sensor, an angular speed detected by the gyroscope sensor, and a longitudinal acceleration detected by the longitudinal acceleration sensor. On the basis of the travel distance and the azimuth, the map location calculator 12 may perform localization of the position of the own vehicle M.

The destination data input device 15 may be a terminal device to be operated by a person on a vehicle such as a driver or a passenger. The destination data input device 15 may be used to enter a set of data demanded for determining a traveling route in the map location calculator 12, such as a destination and a transit point (e.g., a service area of a highway).

The destination data input device 15 may be, in one example, an input unit of a car navigation system (e.g., a touch panel of a monitor), a portable terminal such as a smartphone, or a personal computer. The destination data input device 15 may be coupled by wire or wirelessly to the map location calculator 12.

When the driver or the passenger operates the destination data input device 15 to input data on the destination or the transit point, such as a name of a facility, an address, or a telephone number, the map location calculator 12 may read the input data. The map location calculator 12 may set positional coordinates (i.e., a latitude and a longitude) of the inputted destination or transit point.

The map location calculator 12 may include an own vehicle position estimation calculator 12a, a road map data acquisition unit 12b, and a target traveling course setting calculator 12c. The own vehicle position estimation calculator 12a may estimate the own vehicle position. The target traveling course setting calculator 12c may set a target traveling course. The own vehicle position estimation calculator 12a may acquire positional data of the own vehicle M that indicates the positional coordinates (i.e., a latitude and a longitude) of the own vehicle M, on the basis of positional signals received by the GNSS receiver 13. While the own vehicle M is traveling in an environment where the own vehicle M has difficulty in receiving effective positional signals from the GNSS satellites due to decreased sensitivity of the GNSS receiver 13, the own vehicle position estimation calculator 12a may estimate the positional coordinates of the own vehicle M on the basis of signals from the autonomous traveling sensor 14.

The road map data acquisition unit 12b may perform map matching of the positional coordinates of the own vehicle M and the positional coordinates (i.e., the latitude and the longitude) of the destination set by the destination data input device 15 on the road map stored in the high-precision road map database 16. The road map data acquisition unit 12b may thereby identify the position of the own vehicle M and the position of the destination, and transmit, to the target traveling course setting calculator 12c, road map data on the road map from the current position of the own vehicle M to a region around the destination.

The high-precision road map database 16 may be stored in a mass storage medium, such as a hard disk drive (HDD), and include high-precision road map data or a dynamic map. The high-precision road map data may include lane data, such as data on a width of the lane, data on coordinates of the middle of the lane, data on an azimuthal angle of the lane in the traveling direction, data on a speed limit, a stop line L1 illustrated in FIG. 2, and any other pieces of data necessary for execution of automatic driving. The lane data may be allocated to respective lanes on the road map. For example, the lane data may be allocated to respective regions of each lane on the road map, and the respective regions may extend along the lane at several meter intervals.

The target traveling course setting calculator 12c may first create, on the road map, a traveling route connecting the current position of the own vehicle M and the position of the destination that are identified through the map matching by the road map data acquisition unit 12b. Thereafter, the target traveling course setting calculator 12c may sequentially determine, on the traveling route, a target traveling course along which the own vehicle M is to automatically travel, and update the target traveling course. For example, the target traveling course may be set as a traveling course extending straight ahead, a traveling course turning right or left at an intersection, a traveling course set on a left lane, a middle lane, or a right lane of a straight road, or a traveling course defining a lateral position of the own vehicle M on the lane. The target traveling course may extend several hundred meters or several kilometers ahead of the own vehicle M. Note that the data on the target traveling course may be read by the vehicle control unit 22.

The camera unit 21 may be fixed on an upper central portion of a front interior side of the own vehicle M. The camera unit 21 may include a vehicle-mounted camera, an image processing unit (IPU) 21c, and the front traveling environment recognition unit 21d. The vehicle-mounted camera may be a stereo camera that includes a main camera 21a and a sub-camera 21b disposed at respective positions bilaterally symmetric to each other about a line extending through a middle of a width of the own vehicle M.

The main camera 21a and the sub-camera 21b each may capture an image of a predetermined imaging region ahead of the own vehicle M, and output thus-obtained traveling environment image data to the IPU 21c. The IPU 21c may perform predetermined image processing on the traveling environment image data, and output, to the front traveling environment recognition unit 21d, the traveling-environment image data having been subjected to the image processing.

The front traveling environment recognition unit 21d may read the traveling environment image data having been subjected to the image processing by the IPU 21c to recognize a front traveling environment (i.e., front traveling environment data) on the basis of the traveling environment image data. The front traveling environment data recognized by the front traveling environment recognition unit 21d may include data on a road shape of the traveling course of the own vehicle M (hereinafter also referred to as an "own vehicle traveling course"), data on an intersection, a stop line L2 illustrated in FIG. 2, data on a color of a signal indicated by a traffic light, data on road signs, and data on a pedestrian or a bicycle crossing the lane, for example. Specific but non-limiting examples of the data on the road shape of the own vehicle traveling course may include a road curvature [1/m] of the middle of the lane between two lane lines defining left and right of the lane, and the width of the lane between the left and right lane lines (i.e., lane width).

The vehicle control unit 22 may include a vehicle control calculator 22a, a stop line detector 22b, and a stop position processor 22c. The vehicle control unit 22 may have an input terminal coupled to the target traveling course setting calculator 12c of the map location calculator 12, the front traveling environment recognition unit 21d of the camera unit 21, and a traveling data detector 26, for example. The vehicle control unit 22 may acquire data on a traveling environment in a predetermined range of a target traveling course ahead of the own vehicle M, on the basis of the road map data around the target traveling course determined by the target traveling course setting calculator 12c and the front traveling environment data recognized by the front traveling environment recognition unit 21d. In one embodiment, the stop line detector 22b may serve as a "stop line detector" or a "detector". In one embodiment, the stop position processor 22c may serve as a "stop position processor" or a "processor".

The traveling data detector 26 may include various sensors that detect data on traveling of the own vehicle M, such as a vehicle speed of the own vehicle M (i.e., own vehicle speed), acceleration and deceleration rates, a time required to reach a stop line, an intervehicle distance between a preceding vehicle and the own vehicle M, a relative speed between the preceding vehicle and the own vehicle M, and any other pieces of data necessary for execution of the automatic driving of the own vehicle M.

The vehicle control unit 22 may have an output terminal coupled to a steering processor 31, a brake processor 32, an acceleration deceleration processor 33, and a warning device 34. The steering processor 31 may cause the own vehicle M to travel along the target traveling course. The brake processor 32 may decelerate or stop the own vehicle M by forcible braking. The acceleration deceleration processor 33 may control a vehicle speed of the own vehicle M. The warning device 34 may inform the driver of a warning in accordance with a situation recognized on the basis of the front traveling environment.

The vehicle control calculator 22a may perform a predetermined control on the steering processor 31, the brake processor 32, and the acceleration deceleration processor 33 to cause the own vehicle M to automatically travel along the target traveling course on the road map on the basis of the positioning signals indicating the position of the own vehicle M received by the GNSS receiver 13. As described above, the target traveling course may be determined by the target traveling course setting calculator 12c. During the automatic driving, the vehicle control calculator 22a may perform a known adaptive cruise control (ACC) and a known active lane keep (ALK) control on the basis of the front traveling environment recognized by the front traveling environment recognition unit 21d. When detecting a preceding vehicle, the vehicle control calculator 22a may cause the own vehicle M to travel following the preceding vehicle. When detecting no preceding vehicle, the vehicle control calculator 22a may cause the own vehicle M to travel along the traveling lane at an ACC set vehicle speed set by the driver, with a speed limit of the road being an upper limit.

The stop line detector 22b detects the stop line L1 on the basis of the high-precision map data read from the high-precision road map database 16. In one embodiment, the stop line L1 may serve as a "first stop line". The stop line detector 22b detects the stop line L2 on the basis of the front traveling environment recognized by the front traveling environment recognition unit 21d of the camera unit 21. In one embodiment, the stop line L2 may serve as a "second stop line". The stop line L1 may be a stop line recognized on the basis of the map data stored in the high-precision road map database 16. The stop line L2 may be a stop line actually recognized on a traveling road by the main camera 21a and the sub-camera 21b while the own vehicle M is traveling.

The stop position processor 22c may determine a necessity of an override of a control of an automatic stop, on the basis of a known time to collision (TTC). The time to collision (TTC) may be calculated on the basis of a relative distance between a target and the own vehicle M and a relative speed between the target and the own vehicle M. The target may be the stop line L1 or the stop line L2. In a case where the stop position processor 22c determines that there is no difficulty in executing the override of the control of the automatic stop, the stop position processor 22c may calculate a deceleration rate on the basis of the stop line L1 or the stop line L2 detected by the stop line detector 22b, and control a stop position at which the own vehicle M is to stop automatically.

For example, referring to FIG. 2, the stop position processor 22c calculates the deceleration rate on the basis of a distance from the own vehicle M to the stop line L1 that is based on the map data and starts decelerating the own vehicle M, in a case where the stop line L1 is detected on the basis of the map data in a controllable area that is based on the map data. Further, the stop position processor 22c calculates the deceleration rate on the basis of a distance from the own vehicle M to the stop line L2 that is based on the camera data (or the front traveling environment data) acquired by the camera unit 21 and controls the own vehicle M to stop at the stop line L2, in a case where the stop line L2 is detected on the basis of the front traveling environment in a controllable area that is based on the camera data. In some embodiments, the distance from the own vehicle M to the stop line L1 that is based on the map data may be a distance from a front bumper of the own vehicle M to the stop line L1. In some embodiments, the distance from the own vehicle M to the stop line L2 that is based on the camera data may be a distance from the front bumper of the own vehicle M to the stop line L2.

The stop position processor 22c may calculate the deceleration rate on the basis of the distance from the own vehicle M to the stop line L1 that is based on the map data and start the deceleration of the own vehicle M at the calculated deceleration rate, in a case where the stop line L1 is detected from the map data with the stop line L2 not being detected by the camera unit 21. Once the detection of the stop line L2 becomes successful by the camera unit 2, the stop position processor 22c may calculate the deceleration rate on the basis of the distance from the own vehicle M to the stop line L2 that is based on the camera data and automatically stop the own vehicle M at the stop line L2 by decelerating the own vehicle M at the calculated deceleration rate, instead of using the stop line L1 that is based on the map data.

Starting the deceleration of the own vehicle M in advance on the basis of the stop line L1 detected from the map data with the stop line L2 not being detected on the basis of the camera data helps to secure a control time required for the automatic stop and thus helps to increase an opportunity of the override of the control of the automatic stop. In addition, starting the deceleration of the own vehicle M in advance helps to prevent a sudden deceleration from occurring even in a case where the detection of the stop line L2 on the basis of the camera data acquired by the camera unit 21 is delayed, and thus helps to execute deceleration that does not give a driver a sense of discomfort. Further, starting the deceleration of the own vehicle M in advance helps to decrease the vehicle speed of the own vehicle M and thus helps to increase an accuracy of the detection of the stop line L2 that is based on the camera data acquired by the camera unit 21, which helps to stabilize an accuracy of detection of the stop position at which the own vehicle M is to stop automatically.

In a case where the stop line L2 is detected by the camera unit 21 following the detection of the stop line L1 on the basis of the map data, the stop position processor 22c may compare a position of the stop line L1 that is based on the map data with a position of the stop line L2 that is based on the camera data. Further, the stop position processor 22c may change a deceleration control in response to a result of the comparison and control the own vehicle M to automatically stop at the stop line L2. In a case where the stop line L2 is not detected by the camera unit 21 following the detection of the stop line L1 on the basis of the map data, the stop position processor 22c may control the own vehicle M to automatically stop at the stop line L1 that is detected on the basis of the map data.

Figure 3:
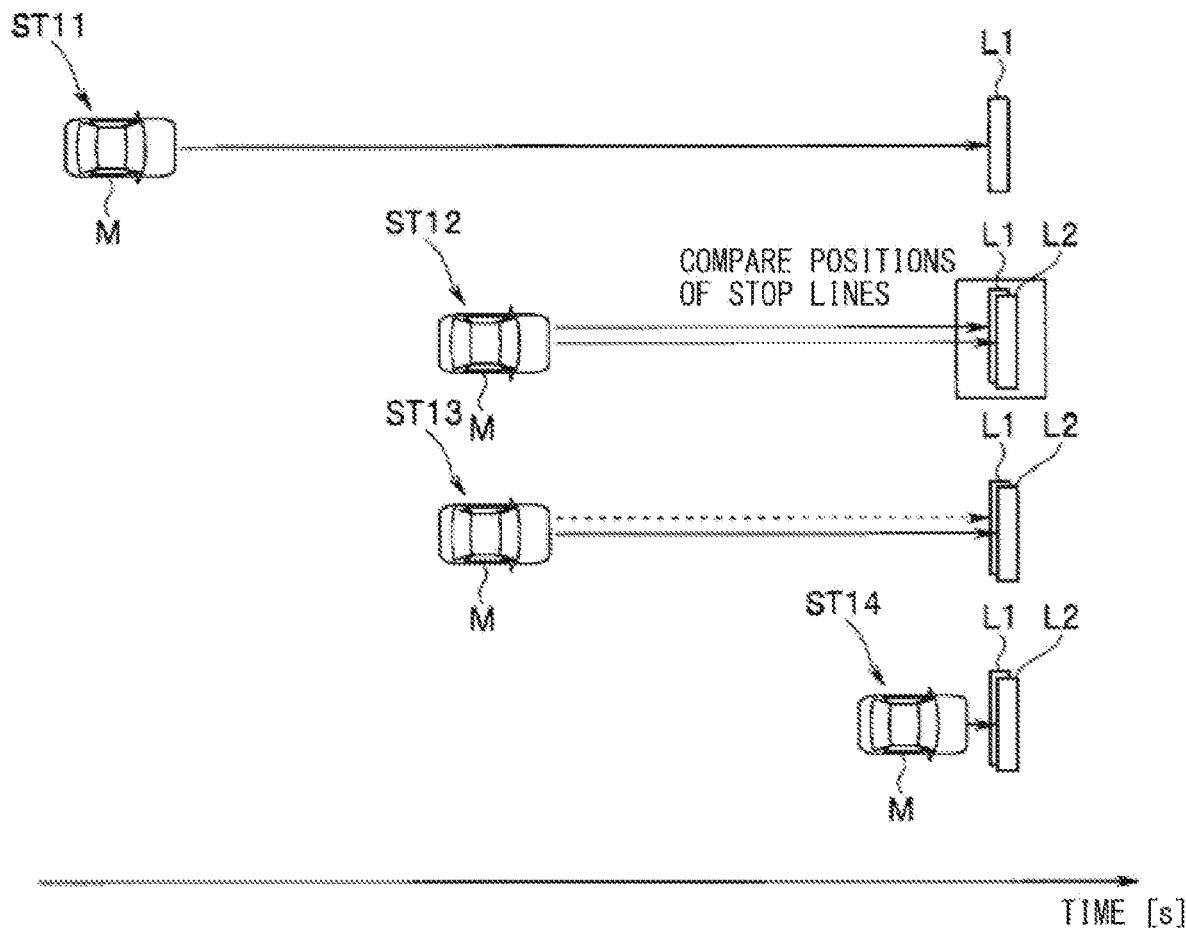
FIG. 3 is a diagram illustrating an example situation of an automatic stop of the vehicle in a case where a position of a stop line based on the map data and a position of a stop line based on the camera data are coincident with each other.

Described now in detail is an example of a control of the automatic stop of the own vehicle M with reference to FIG. 3. The control of the automatic stop according to an example embodiment may be executed on the premise that the stop line L1 is detected first on the basis of the map data and the stop line L2 is detected on the basis of the camera data thereafter. Further, the control of the automatic stop according to an example embodiment may be executed in a case where the vehicle control unit 22 determines that no obstacle is detected ahead of or around the own vehicle M on the basis of the camera data and that there is no difficulty in executing the override of the control of the automatic stop on the basis of the time to collision (TTC) described above.

Referring to FIG. 3, in a case where the stop line L1 that is based on the map data is detected, the stop position processor 22c may calculate the deceleration rate on the basis of the distance from the own vehicle M to the stop line L1 that is based on the map data, and decelerate the own vehicle M at the calculated deceleration rate (ST11). Thereafter, in a case where the stop line L2 that is based on the camera data is detected, the stop position processor 22c may compare a position of the stop line L1 that is based on the map data with a position of the stop line L2 that is based on the camera data (ST12).

In a case where the stop position processor 22c determines that the position of the stop line L1 that is based on the map data and the position of the stop line L2 that is based on the camera data are coincident or substantially coincident with each other, the stop position processor 22c may calculate the deceleration rate on the basis of the distance from the own vehicle M to the stop line L2 that is based on the camera data, and decelerate the own vehicle M at the calculated deceleration rate (ST13). The stop position processor 22c may stop the own vehicle M in a case where the distance from the own vehicle M to the stop line L2 that is based on the camera data becomes 0 (zero) or substantially 0 (zero), and may end the control of the automatic stop of the own vehicle M (ST14).

Figure 4:
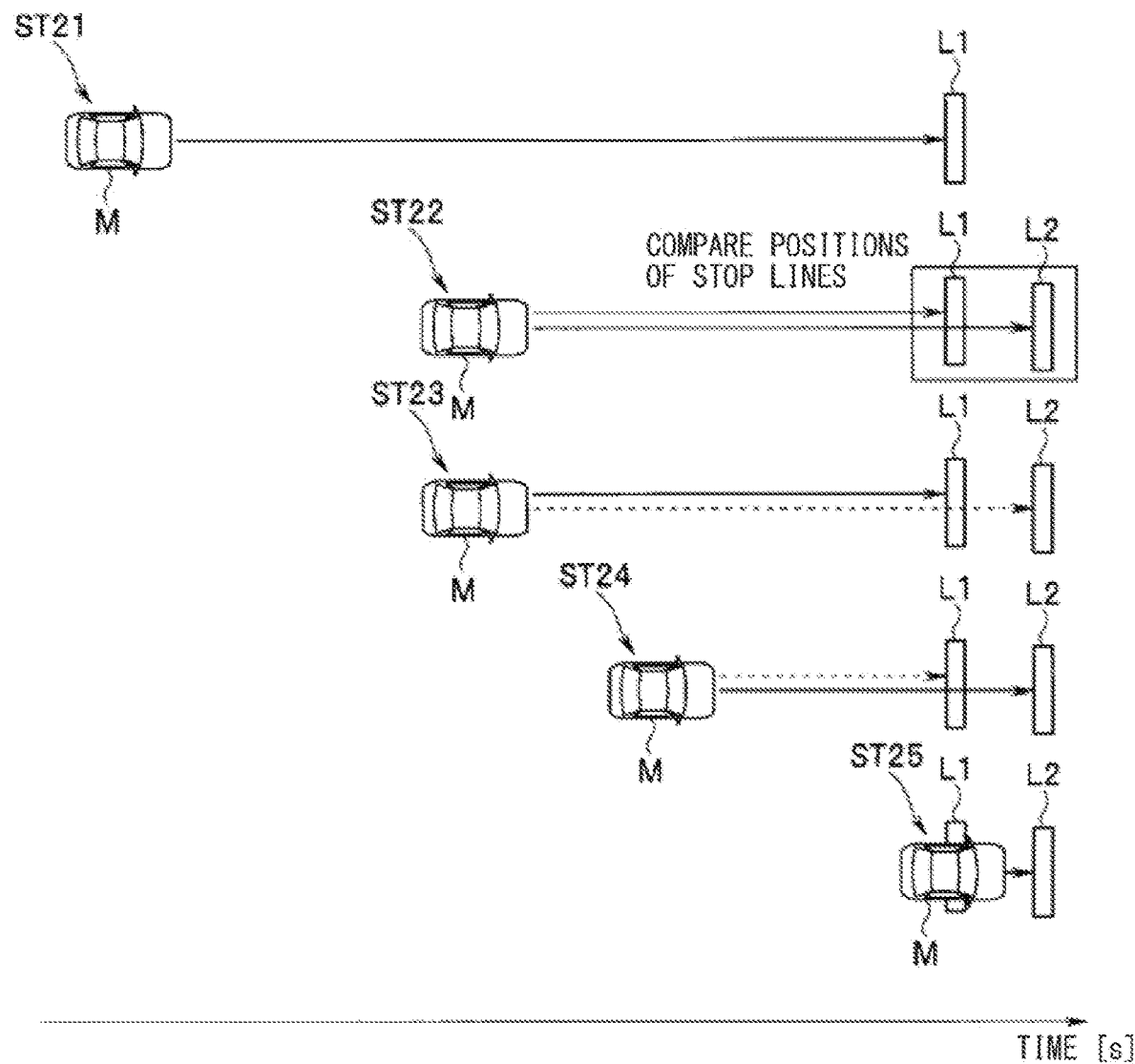
FIG. 4 is a diagram illustrating an example situation of an automatic stop of the vehicle in a case where the position of the stop line based on the map data is in front of the position of the stop line based on the camera data.

Referring to FIG. 4, in a case where the stop line L1 that is based on the map data is detected, the stop position processor 22c may calculate the deceleration rate on the basis of the distance from the own vehicle M to the stop line L1 that is based on the map data, and decelerate the own vehicle M at the calculated deceleration rate (ST21). Thereafter, in a case where the stop line L2 that is based on the camera data is detected, the stop position processor 22c may compare a position of the stop line L1 that is based on the map data with a position of the stop line L2 that is based on the camera data (ST22).

In a case where the stop position processor 22c determines that the position of the stop line L1 that is based on the map data is in front of the position of the stop line L2 that is based on the camera data with reference to a position of the own vehicle M, i.e., the distance from the own vehicle M to the stop line L1 is shorter than the distance from the own vehicle M to the stop line L2, the stop position processor 22c may calculate the deceleration rate on the basis of the distance from the own vehicle M to the stop line L1 that is based on the map data, and decelerate the own vehicle M at the calculated deceleration rate (ST23). Thereafter, in a case where the detection of the stop line L2 that is based on the camera data becomes stable, or the reliability of the detection of the stop line L2 that is based on the camera data becomes high, the stop position processor 22c may calculate the deceleration rate on the basis of the distance from the own vehicle M to the stop line L2 that is based on the camera data, and decelerate the own vehicle M at the calculated deceleration rate (ST24). The stop position processor 22c may stop the own vehicle M in a case where the distance from the own vehicle M to the stop line L2 that is based on the camera data becomes 0 (zero) or substantially 0 (zero), and may end the control of the automatic stop of the own vehicle M (ST25).

Figure 5:
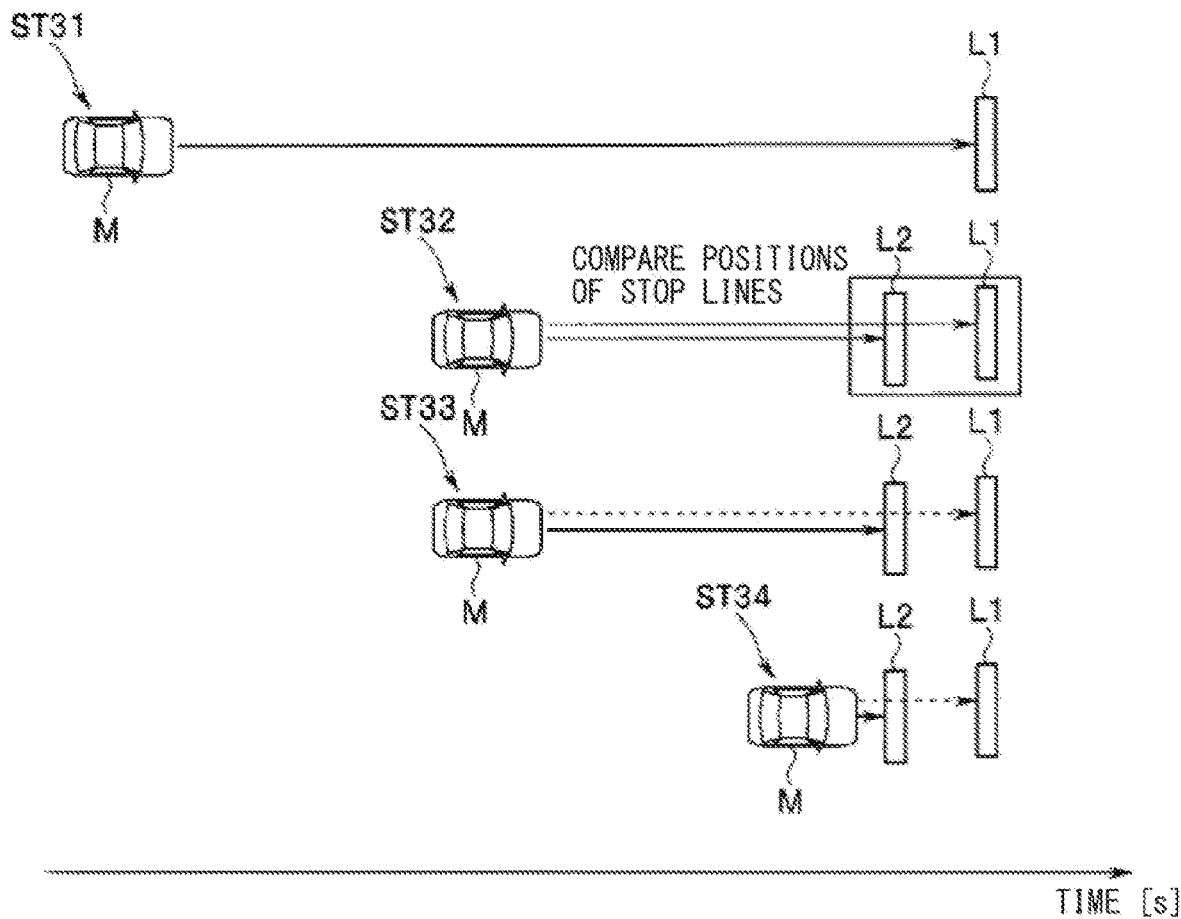
FIG. 5 is a diagram illustrating an example situation of an automatic stop of the vehicle in a case where the position of the stop line based on the map data is behind the position of the stop line based on the camera data.

Referring to FIG. 5, in a case where the stop line L1 that is based on the map data is detected, the stop position processor 22c may calculate the deceleration rate on the basis of the distance from the own vehicle M to the stop line L1 that is based on the map data, and decelerate the own vehicle M at the calculated deceleration rate (ST31). Thereafter, in a case where the stop line L2 that is based on the camera data is detected, the stop position processor 22c may compare a position of the stop line L1 that is based on the map data with a position of the stop line L2 that is based on the camera data (ST32).

In a case where the stop position processor 22c determines that the position of the stop line L1 that is based on the map data is behind the position of the stop line L2 that is based on the camera data with reference to a position of the own vehicle M, i.e., the distance from the own vehicle M to the stop line L1 is longer than the distance from the own vehicle M to the stop line L2, the stop position processor 22c may calculate the deceleration rate on the basis of the distance from the own vehicle M to the stop line L2 that is based on the camera data, and decelerate the own vehicle M at the calculated deceleration rate (ST33). The stop position processor 22c may stop the own vehicle M in a case where the distance from the own vehicle M to the stop line L2 that is based on the camera data becomes 0 (zero) or substantially 0 (zero), and may end the control of the automatic stop of the own vehicle M (ST34).

Figure 6:
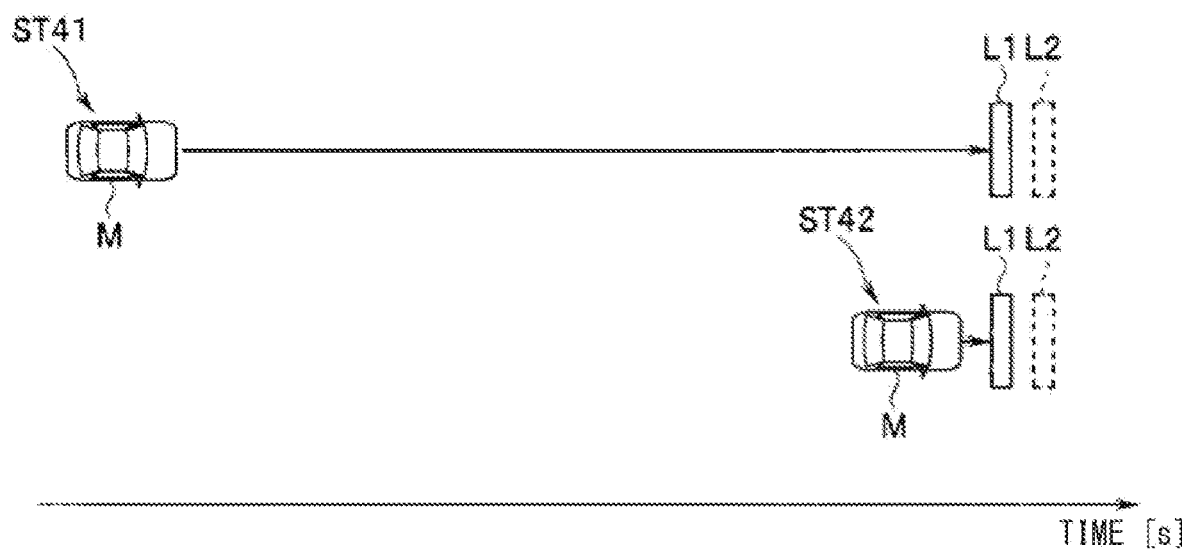
FIG. 6 is a diagram illustrating an example situation of an automatic stop of the vehicle in a case where the stop line based on the camera data is not detected.

Referring to FIG. 6, in a case where the stop line L1 that is based on the map data is detected, the stop position processor 22c may calculate the deceleration rate on the basis of the distance from the own vehicle M to the stop line L1 that is based on the map data, and decelerate the own vehicle M at the calculated deceleration rate (ST41). Thereafter, if the stop line L2 that is based on the camera data is not detected, the stop position processor 22c may stop the own vehicle M in a case where the distance from the own vehicle M to the stop line L1 that is based on the map data becomes 0 (zero) or substantially 0 (zero), and may end the control of the automatic stop of the own vehicle M (ST42).

Accordingly, the control of the automatic stop according to an example embodiment may detect the stop line L1 and the stop line L2 through combined use of the map data and the camera data. Further, the control of the automatic stop according to an example embodiment may change the deceleration rate in response to a factor such as a positional relationship between the stop line L1 and the stop line L2 or the accuracy of the detection of the stop line L1 or L2, and may automatically stop the own vehicle M at the stop line L1 or L2.

Figure 7:
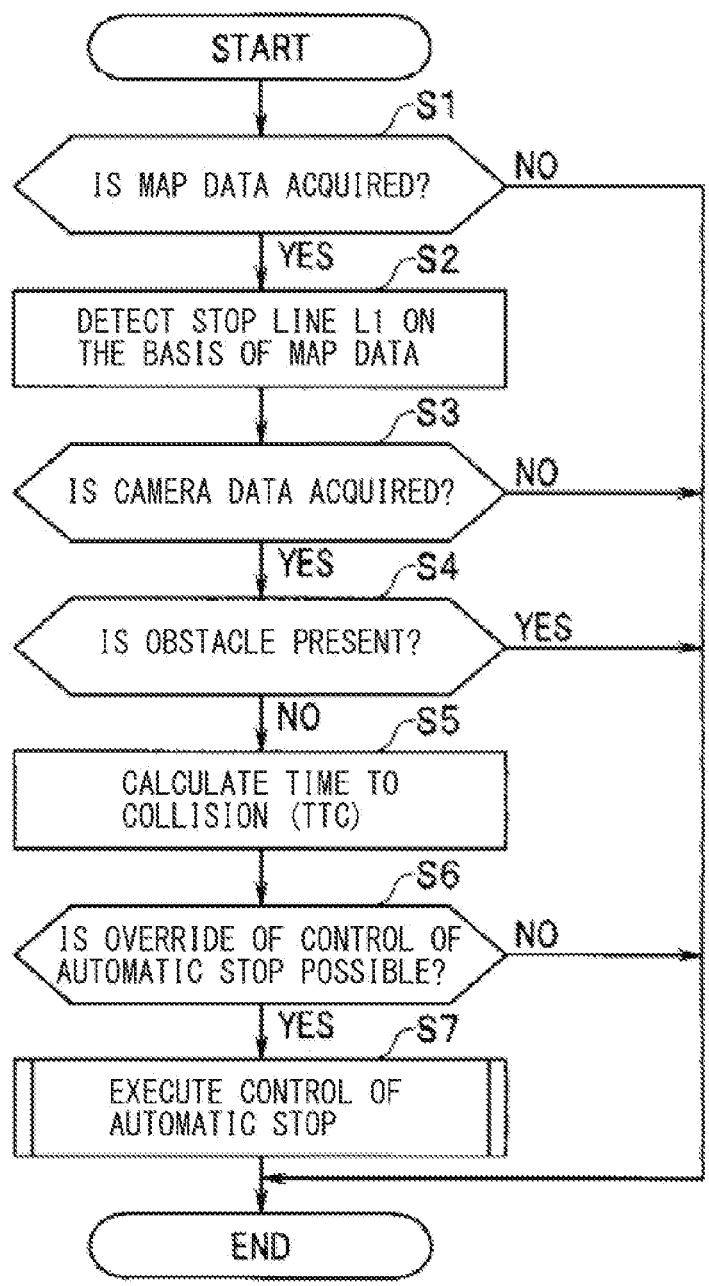
FIG. 7 is a flowchart illustrating an example of a flow of determining an override of a control of the automatic stop.
Figure 8:
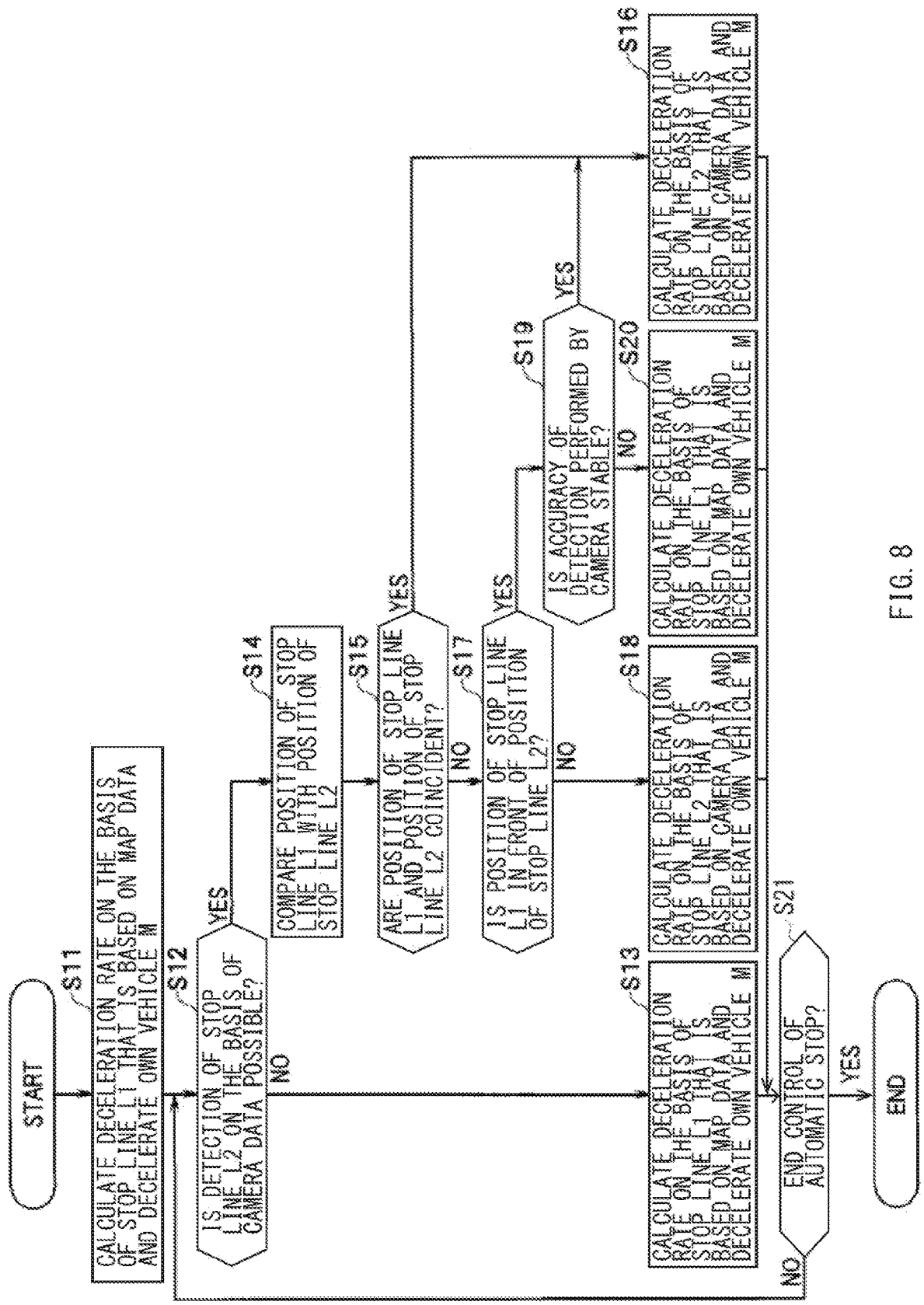
FIG. 8 is a flowchart illustrating an example of a flow of control of the automatic stop performed in step S7 illustrated in FIG. 7.

Described now is an example of a process of the control of the automatic stop of the own vehicle M. It should be noted that the process of the control of the automatic stop illustrated in FIGS. 7 and 8 may be executed by the vehicle control unit 22 for each predetermined calculation cycle during the execution of the automatic driving.

In step S1, the vehicle control unit 22 may determine whether the map data is acquired from the high-precision road map database 16. If the vehicle control unit 22 determines that the map data is not acquired (step S1: NO), the vehicle control unit 22 may end the process. If the vehicle control unit 22 determines that the map data is acquired (step S1: YES), the process may proceed to step S2. In step S2, the vehicle control unit 22 may detect the stop line L1 on the basis of the map data.

Thereafter, in step S3, the vehicle control unit 22 may determine whether the camera data, or the front traveling environment data, is acquired by the camera unit 21. If the vehicle control unit 22 determines that the camera data is not acquired (step S3: NO), the vehicle control unit 22 may end the process. If the vehicle control unit 22 determines that the camera data is acquired (step S3: YES), the process may proceed to step S4. In step S4, the vehicle control unit 22 may determine whether an obstacle is present ahead of and around the own vehicle M on the basis of the camera data.

If the vehicle control unit 22 determines that the obstacle is present in ahead of and around the own vehicle M (step S4: YES), the vehicle control unit 22 may end the process. If the vehicle control unit 22 determines that the obstacle is not present ahead of and around the own vehicle M (step S4: NO), the process may proceed to step S5. In step S5, the vehicle control unit 22 may calculate the time to collision (TTC) required for the own vehicle M to reach the stop line L1. Thereafter, in step S6, the vehicle control unit 22 may determine whether it is possible to execute the override of the control of the automatic stop on the basis of the time to collision (TTC).

If the vehicle control unit 22 determines that it is not possible to execute the override of the control of the automatic stop (step S6: NO), the vehicle control unit 22 may end the process. If the vehicle control unit 22 determines that it is possible to execute the override of the control of the automatic stop (step S6: YES), the process may proceed to step S7. In step S7, the vehicle control unit 22 may execute the control of the automatic stop, and may end the process. An example of the control of the automatic stop performed in step S7 is described below with reference to FIG. 8.

Upon executing the override of the control of the automatic stop, in step S11, the vehicle control unit 22 may calculate the deceleration rate on the basis of the distance from the own vehicle M to the stop line L1 detected on the basis of the map data, and decelerate the own vehicle M at the calculated deceleration rate. Thereafter, in step S12, the vehicle control unit 22 may determine whether it is possible to detect the stop line L2 on the basis of the camera data. If the vehicle control unit 22 determines that it is not possible to detect the stop line L2 on the basis of the camera data (step S12: NO), the process may proceed to step S13. In step S13, the vehicle control unit 22 may decelerate the own vehicle M at the deceleration rate calculated on the basis of the distance from the own vehicle M to the stop line L1 detected on the basis of the map data. In other words, the vehicle control unit 22 may continue the deceleration of the own vehicle M at the deceleration rate calculated in the process of step S11. If the vehicle control unit 22 determines that it is possible to detect the stop line L2 on the basis of the camera data (step S12: YES), the process may proceed to step S14. In step S14, the vehicle control unit 22 may compare a position of the stop line L1 detected on the basis of the map data with a position of the stop line L2 detected on the basis of the camera data. For example, the vehicle control unit 22 may compare the distance from the own vehicle M to the stop line L1 that is based on the map data with the distance from the own vehicle M to the stop line L2 that is based on the camera data.

Thereafter, in step S15, the vehicle control unit 22 may determine whether the position of the stop line L1 and the position of the stop line L2 are coincident or substantially coincident with each other. If the vehicle control unit 22 determines that the position of the stop line L1 and the position of the stop line L2 are coincident or substantially coincident with each other (step S15: YES), the process may proceed to step S16. In step S16, the vehicle control unit 22 may calculate the deceleration rate on the basis of the distance from the own vehicle M to the stop line L2 detected on the basis of the camera data, and decelerate the own vehicle M at the calculated deceleration rate. If the vehicle control unit 22 determines that the position of the stop line L1 and the position of the stop line L2 are not coincident or not substantially coincident with each other (step S15: NO), the process may proceed to step S17. In step S17, the vehicle control unit 22 may determine whether the position of the stop line L1 detected on the basis of the map data is in front of the position of the stop line L2 detected on the basis of the camera data with reference to a position of the own vehicle M.

If the vehicle control unit 22 determines that the position of the stop line L1 is not in front of the position of the stop line L2, or determines that the position of the stop line L1 is behind the position of the stop line L2 (step S17: NO), the process may proceed to step S18. In step S18, the vehicle control unit 22 may calculate the deceleration rate on the basis of the distance from the own vehicle M to the stop line L2 detected on the basis of the camera data, and decelerate the own vehicle M at the calculated deceleration rate. If the vehicle control unit 22 determines that the position of the stop line L1 is in front of the position of the stop line L2 (step S17: YES), the process may proceed to step S19. In step S19, the vehicle control unit 22 may determine whether an accuracy of the detection performed by the camera is stable. In some embodiments, in step S19, the vehicle control unit 22 may determine whether the accuracy of the detection of the stop line L2 is higher than a predetermined accuracy threshold.

For example, whether the accuracy of the detection performed by the camera is stable may be determined by comparing the distance from the own vehicle M to the detected stop line L2 with a predetermined distance threshold at which the camera unit 21 is able to detect the stop line L2 stably. The vehicle control unit 22 may determine that the accuracy of the detection performed by the camera is not stable, or may determine that the accuracy of the detection of the stop line L2 is lower than the predetermined accuracy threshold, in a case where the distance from the own vehicle M to the detected stop line L2 is equal to or greater than the predetermined distance threshold. The vehicle control unit 22 may determine that the accuracy of the detection performed by the camera is stable, or may determine that the accuracy of the detection of the stop line L2 is higher than the predetermined accuracy threshold, in a case where the distance from the own vehicle M to the detected stop line L2 is less than the predetermined distance threshold.

If the vehicle control unit 22 determines that the accuracy of the detection performed by the camera is not stable (step S19: NO), the process may proceed to step S20. In step S20, the vehicle control unit 22 may calculate the deceleration rate on the basis of the distance from the own vehicle M to the stop line L1 detected on the basis of the map data, and decelerate the own vehicle M at the calculated deceleration rate. If the vehicle control unit 22 determines that the accuracy of the detection performed by the camera is stable (step S19: YES), the process may proceed to step S16. In step S16, the vehicle control unit 22 may calculate the deceleration rate on the basis of the distance from the own vehicle M to the stop line L2 detected on the basis of the camera data, and decelerate the own vehicle M at the calculated deceleration rate.

Following the execution of any of the processes in steps S13, S16, S18, and S20, the vehicle control unit 22 may determine in step S21 whether to end the control of the automatic stop. The vehicle control unit 22 may determine to end the control of the automatic stop (step S21: YES) if the vehicle control unit 22 determines that the distance from the own vehicle M to the stop line L1 or the stop line L2 is 0 (zero) or substantially 0 (zero), or that the vehicle speed of the own vehicle M is 0 (zero) or substantially 0 (zero). The vehicle control unit 22 may cause the process to return to step S12 and continue the control of the automatic control (step S21: NO) if the vehicle control unit 22 determines that the distance from the own vehicle M to the stop line L1 or the stop line L2 is not 0 (zero) or not substantially 0 (zero), or that the vehicle speed of the own vehicle M is not 0 (zero) or not substantially 0 (zero).

According to an example embodiment described above, the vehicle control system 1 calculates the deceleration rate on the basis of the stop line L1 detected on the basis of the map data and starts decelerating the own vehicle M at the calculated deceleration rate, prior to the detection of the stop line L2 on the basis of the camera data. Thereafter, in a case where the stop line L2 is detected on the basis of the camera data, the vehicle control system 1 calculates the deceleration rate on the basis of the stop line L2 and decelerates the own vehicle M at the calculated deceleration rate, and stops the own vehicle M at the stop line L2 on the traveling road detected on the basis of the camera data.

Accordingly, the vehicle control system makes it possible to calculate the deceleration rate on the basis of the stop line L1 detected on the basis of the map data and start decelerating the own vehicle M in advance, even in a case were the detection of the stop line L2 that is based on the camera unit 21 is delayed. Further, in a case where the stop line L2 is detected on the basis of the camera data, the vehicle control system 1 calculates the deceleration rate on the basis of the distance from the own vehicle M to the stop line L2 and decelerates the own vehicle M, making it possible to stop the own vehicle M at the position of the stop line L2 on the traveling road actually acquired by the camera unit 21. Hence, the vehicle control system according to an example embodiment helps to smoothly decelerate a vehicle to a stop line and accurately stop the vehicle at the stop line.

Note that the steps in the flowchart referred to in this specification may be executed in a different order for each execution, the order of execution of the steps may be changed, or a plurality of steps may be executed simultaneously, unless any contradictions occur to the nature of the steps of the flowchart.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The vehicle control unit 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle control unit 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle control unit 22 illustrated in FIG. 1.

The invention claimed is:

1. A vehicle control system to be applied to a vehicle, the vehicle control system comprising:
   a detector configured to detect a first stop line on a basis of map data stored in a road map database, and detect a second stop line on a basis of traveling environment data acquired by a camera unit, the traveling environment data being data on a traveling environment ahead of the vehicle; and
   a processor configured to
   in a case where the detector detects the first stop line, control the vehicle to decelerate at a first deceleration rate calculated on a basis of a distance from the vehicle to the first stop line, and
   in a case where the detector detects the second stop line after detecting the first stop line, control the vehicle to decelerate at a second deceleration rate calculated on a basis of a distance from the vehicle to the second stop line and stop at the second stop line.

2. The vehicle control system according to claim 1, wherein the processor is configured to compare a position of the first stop line with a position of the second stop line, and decelerate the vehicle at the second deceleration rate in a case where the position of the first stop line and the position of the second stop line are coincident with each other.

3. The vehicle control system according to claim 1, wherein the processor is configured to compare a position of the first stop line with a position of the second stop line, and decelerate the vehicle at the second deceleration rate in a case where the position of the first stop line is behind the position of the second stop line with reference to a position of the vehicle.

4. The vehicle control system according to claim 1, wherein the processor is configured to compare a position of the first stop line with a position of the second stop line, and determine an accuracy of the detection of the second stop line in a case where the position of the first stop line is in front of the position of the second stop line with reference to a position of the vehicle.

5. The vehicle control system according to claim 4, wherein the processor is configured to decelerate the vehicle at the first deceleration rate in a case where the processor determines that the accuracy of the detection of the second stop line is lower than a threshold, and decelerate the vehicle at the second deceleration rate in a case where the processor determines that the accuracy of the detection of the second stop line is higher than the threshold.

6. A vehicle control system to be applied to a vehicle, the vehicle control system comprising
   circuitry configured to
   detect a first stop line on a basis of map data stored in a road map database,
   detect a second stop line on a basis of traveling environment data acquired by a camera unit, the traveling environment data being data on a traveling environment ahead of the vehicle,
   upon detecting the first stop line, control the vehicle to decelerate at a first deceleration rate calculated on a basis of a distance from the vehicle to the first stop line, and
   upon detecting the second stop line after detecting the first stop line, control the vehicle to decelerate at a second deceleration rate calculated on a basis of a distance from the vehicle to the second stop line and stop at the second stop line.

* * * * *